United States Patent
Blum et al.

(10) Patent No.: US 9,782,625 B1
(45) Date of Patent: Oct. 10, 2017

(54) USER INTERFACE ON CONSOLE FOR EXERCISE MACHINE

(71) Applicant: Brunswick Corporation, Lake Forest, IL (US)

(72) Inventors: Matthew P. Blum, Chicago, IL (US); Warren A. Rickert, Glen Ellyn, IL (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 15/040,013

(22) Filed: Feb. 10, 2016

(51) Int. Cl.
*A47B 23/00* (2006.01)
*A63B 24/00* (2006.01)
*A63B 22/02* (2006.01)

(52) U.S. Cl.
CPC .......... *A63B 24/0087* (2013.01); *A63B 22/02* (2013.01)

(58) Field of Classification Search
USPC .................................................. 482/1–9, 54
See application file for complete search history.

(56) References Cited

U.S. PATENT DOCUMENTS

| | | | | |
|---|---|---|---|---|
| 5,085,427 A * | 2/1992 | Finn | ....................... | A63B 24/00 248/441.1 |
| 5,316,256 A * | 5/1994 | Siebenaler | ........... | A47B 23/042 248/453 |
| 7,044,891 B1 * | 5/2006 | Rivera | ............... | A63B 21/0053 482/1 |
| 7,166,062 B1 * | 1/2007 | Watterson | .............. | A63B 22/00 482/1 |
| 7,215,376 B2 * | 5/2007 | Adams | ................ | B60R 11/0211 348/448 |
| 7,359,624 B2 * | 4/2008 | Adams | ............ | H04N 21/44004 348/E5.062 |
| 7,435,202 B2 | 10/2008 | Daly et al. | | |
| 7,476,181 B1 | 1/2009 | Honda | | |
| 7,628,730 B1 * | 12/2009 | Watterson | ............ | A63B 21/005 482/1 |
| 7,846,070 B2 | 12/2010 | Oglesby et al. | | |
| 7,985,164 B2 * | 7/2011 | Ashby | ..................... | A63B 22/02 434/247 |
| 8,079,937 B2 * | 12/2011 | Bedell | .................. | A63B 22/001 482/1 |
| 8,103,517 B2 * | 1/2012 | Hinnebusch | ....... | A63B 24/0084 482/4 |
| 8,104,411 B2 * | 1/2012 | Fenton | ................... | A47B 23/04 108/152 |
| 8,337,366 B2 * | 12/2012 | Jones | ................... | A63B 69/004 482/8 |
| 8,845,493 B2 * | 9/2014 | Watterson | .............. | A63B 22/02 482/1 |

(Continued)

OTHER PUBLICATIONS

"Extra motivation to keep your members moving", PRECOR, https://www.precor.com/en-us/entertainment-options.

*Primary Examiner* — Stephen R Crow
(74) *Attorney, Agent, or Firm* — Andrus Intellectual Property Law, LLP

(57) ABSTRACT

A console for an exercise machine has a console housing providing a user interface for controlling the exercise machine and a media rack removably attached to the console housing and having a shelf sized to support a media item. At least one touch input element is on the media rack and is operable to control an auxiliary device on the exercise machine.

20 Claims, 8 Drawing Sheets

(56) References Cited

U.S. PATENT DOCUMENTS

| | | | |
|---|---|---|---|
| 9,216,317 B2 * | 12/2015 | Golen, Jr. | A63B 22/04 |
| 9,364,714 B2 * | 6/2016 | Koduri | A63B 24/0087 |
| 2003/0168571 A1 * | 9/2003 | Malejko | A47B 23/04 |
| | | | 248/447.1 |
| 2004/0014566 A1 * | 1/2004 | Kao | A63B 24/00 |
| | | | 482/8 |
| 2006/0240947 A1 * | 10/2006 | Qu | A63B 24/0084 |
| | | | 482/1 |
| 2007/0254778 A1 * | 11/2007 | Ashby | A63B 22/001 |
| | | | 482/5 |
| 2008/0242511 A1 * | 10/2008 | Munoz | A63B 22/02 |
| | | | 482/5 |
| 2009/0269728 A1 * | 10/2009 | Verstegen | A63B 21/00196 |
| | | | 434/247 |
| 2013/0178334 A1 * | 7/2013 | Brammer | A63B 71/0622 |
| | | | 482/4 |
| 2014/0213415 A1 * | 7/2014 | Parker | A61B 5/1116 |
| | | | 482/8 |
| 2015/0238817 A1 * | 8/2015 | Watterson | G06F 19/3481 |
| | | | 482/8 |
| 2015/0306456 A1 * | 10/2015 | Pasini | A63B 24/00 |
| | | | 482/4 |
| 2016/0066835 A1 * | 3/2016 | He | A61B 5/6898 |
| | | | 482/4 |
| 2016/0206922 A1 * | 7/2016 | Dalebout | A63B 24/0087 |

\* cited by examiner

USER INTERFACE ON CONSOLE FOR EXERCISE MACHINE

FIELD

The present disclosure relates generally to user interfaces for controlling exercise equipment and/or auxiliary devices associated therewith, such as for controlling media devices.

BACKGROUND

The following U.S. patent is incorporated herein by reference in their entireties:

U.S. Pat. No. 7,435,202 discloses that in an elliptical step exercise apparatus distance traveled can be approximated by determining the portion of the ellipse traversed by a foot pedal where the user applies force to the pedal. This portion can be considered equivalent to the amount of foot travel on a treadmill and modified as a function of speed to simulate the gait of a user at various speeds so as to provide an approximation of the distance traveled by a user as if he were running on a treadmill. This process can be further modified for use with an elliptical exercise apparatus where the stride length can be changed such that the simulated distance will be increased with increased stride length.

U.S. Pat. No. 7,476,181 discloses exercise apparatus, including treadmills having an endless loop belt driven by an electric motor to exercise the user, has a dual function common stop switch assembly at a singular location on a control console, which assembly has first and second switches each actuatable separately from each other to independently stop the exercise movement member such as a treadbelt. The construction eliminates separately located stop switches.

U.S. Pat. No. 7,846,070 discloses a microprocessor based exercise treadmill control system which includes various features to enhance user operation. These features include programs operative to: permit a set of user controls to cause the treadmill to initially operate at predetermined speeds; permit the user to design custom workouts; permit the user to switch between workout programs while the treadmill is in operation; and perform an automatic cooldown program where the duration of the cooldown is a function of the duration of the workout or the user's heart rate. The features also include a stop program responsive to a detector for automatically stopping the treadmill when a user is no longer on the treadmill and a frame tag module attached to the treadmill frame having a non-volatile memory for storing treadmill configuration, and operational and maintenance data. Another included feature is the ability to display the amount of time a user spends in a heart rate zone.

U.S. Patent Application No. 2008/0242511 discloses user interface methods and an apparatus for controlling exercise apparatus. An example user interface includes an exercise parameter input and an indicator associated with the exercise parameter input, and a control unit to activate the indicator in response to a training routine to prompt a user of the exercise apparatus to adjust an operation of the exercise apparatus via the exercise parameter input.

SUMMARY

This Summary is provided to introduce a selection of concepts that are further described herein below in the Detailed Description. This Summary is not intended to identify key or essential features from the claimed subject matter, nor is it intended to be used as an aid in limiting the scope of the claimed subject matter.

In one embodiment, a console for an exercise machine has a console housing providing a user interface for controlling the exercise machine and a media rack removably attached to the console housing and having a shelf sized to support a media item. At least one touch input element is on the media rack and is operable to control an auxiliary device on the exercise machine.

One embodiment of an exercise machine comprises a console providing a user interface for controlling the exercise machine, the console having a console housing. A media rack attaches to the console housing that has a shelf sized to support a media item and has at least one touch input element that is operable to control an auxiliary device on the exercise machine.

BRIEF DESCRIPTION OF THE DRAWINGS

Examples of the present disclosure are described with reference to the following drawing FIGURES. The same numbers are used throughout the FIGURES to reference like features and components.

DETAILED DESCRIPTION OF THE DRAWINGS

Figure 1:
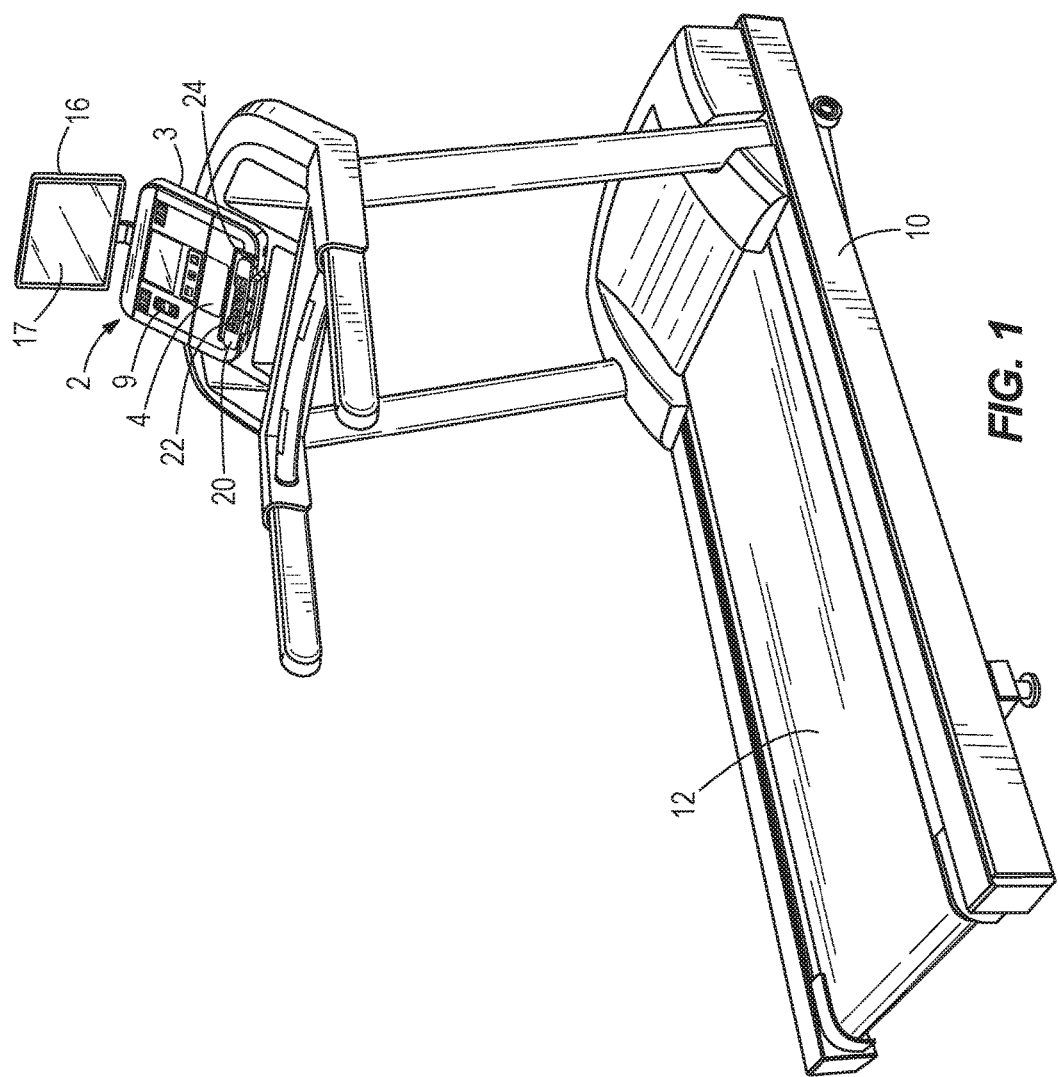
FIG. 1 illustrates an exemplary exercise machine having a console with a media rack.

FIG. 1 depicts an exemplary embodiment of an exercise machine 10 having an exercise member 12, which in the depicted embodiment is a moving tread on a treadmill. In other embodiments, the exercise machine 10 may be any exercise apparatus provided with a console 2, including but not limited to, a stationary bicycle, an elliptical trainer, a climber, a rowing machine, a stair stepper machine, or the like. The exercise machine 10 has a console 2 providing a user interface 9 for controlling the function of the exercise machine and devices associated therewith. The user interface 9 may include, for example, one or more switches, buttons, levers, and/or keypads to facilitate user control and/or data entry. For example, users may interact with the user interface 9 to enter a weight, an age, a target heart rate, select one or more preprogrammed training routines, or devise a personalized training routine. The console 2 includes a media rack 20 that has a shelf 24 for holding a media item, such as a magazine, book, cell phone, tablet, or other portable electronic device.

The auxiliary device of FIG. 1 is a media device 16, which in the exemplary embodiment is a television on the exercise machine 10 that is controllable by the user operating the exercise machine 10. For example, the television media device 16 has a display 17 which may present broadcast television media, display and/or satellite media, music videos, movie, and/or training videos during a workout by the user. As will be known to a person having ordinary skill in the art, presently available consoles for exercise machines are often configured to provide control for media devices. Many different types of media devices 16 and other auxiliary devices are available for attachment to exercise machines 10, each requiring a different set of controls. More generally, the auxiliary device may be any device that can be physically connected to or associated with the exercise machine 10 and is meant to be operated with or cooperate with the exercise machine 10, several different examples of which are provided herein.

Through their experimentation and research, the present inventors recognized that it is desirable to provide purchasers of exercise machines 10 with various exercise machine options with different media devices 16 or other auxiliary devices, and also providing a lower cost option of a machine without any auxiliary device. The inventors also recognized that providing various auxiliary device options, including the lack of an auxiliary device, requires providing different consoles with different control arrangements and designs based on the auxiliary device (or lack thereof) that is controlled. However, providing specialized consoles for each option is expensive because each embodiment requires a specialized design and arrangement of specialized parts.

Accordingly, upon recognition of the aforementioned need and problem, the present inventors developed the console 2 disclosed herein having a media rack 20 that can be varied and changed out so that a single console 2 design can be provided that has a changeable part, the media rack 20, that allows customization of the base console 2 and also provides the functionality of holding a media device or item. For example, in addition to or as an alternative to providing various auxiliary device control options, the media rack 20 may provide connection ports for an electronic device, an audio connection for listening to the audio output of the media device 16, or the like. Accordingly, the inventors recognized that the media rack 20 could be easily adapted with various input ports, user control inputs, etc., to provide a customized console 2 at a lower cost. Furthermore, the media rack 20 design disclosed herein provides better longevity of the console 2 because if the control elements provided in the media rack 20 fail or malfunction, a new media rack 20 may simply be placed on the console 2 rather than disassembling the entire console or replacing the entire console.

The media rack 20 attaches to a front face 4 of the console 2 by various attachment means, such as hooks, clasps, screws, friction fits, or the like. In one embodiment, the media rack 20 is removably attached to the console 2 such that it can be removed and exchanged with a different media rack 20. In one embodiment, this removal and exchange does not require removal of the console 2 from the exercise machine 10 and can be performed easily while the console 2 remains assembled on the exercise machine 10.

Accordingly, the media rack 20 may be provided with at least one touch input element 22 operable to control an auxiliary device on the exercise machine, such as a media device 16 or other auxiliary device, or to provide specialized control of the exercise machine 10. In the embodiment of FIG. 1, the media rack 20 provides multiple touch input elements 22 that operate to control the media device 16, including buttons for controlling volume, channel, on/off function, etc. In other embodiments, the media rack 20 may be provided with various input or output ports for connection with external devices, such as portable electronic devices, or one or more touch input elements 22 for controlling other auxiliary devices or functions of the exercise machine 10.

To provide another example, the auxiliary device may be assistive technology for persons with disabilities, and the media rack 20 may be provided with touch input element(s) 22 to control that adaptive technology. Certain adaptations may be necessary for exercise machines 10 in order to accommodate various disabilities, an the ability to provide the controls for such adaptations on the media rack 20 offers a way to provide an adapted machine at a lower cost. Furthermore, proving the adaptation controls on the media rack, such as on the front bezel 27 thereof, has the added benefit that the controls are easily accessed and located, as they stand out from the front face 4 of the console 2. For example, this could be beneficial to a visually impaired person, who could easily find adaptive controls located on the front bezel 27 of the media rack 20.

Figure 2A:
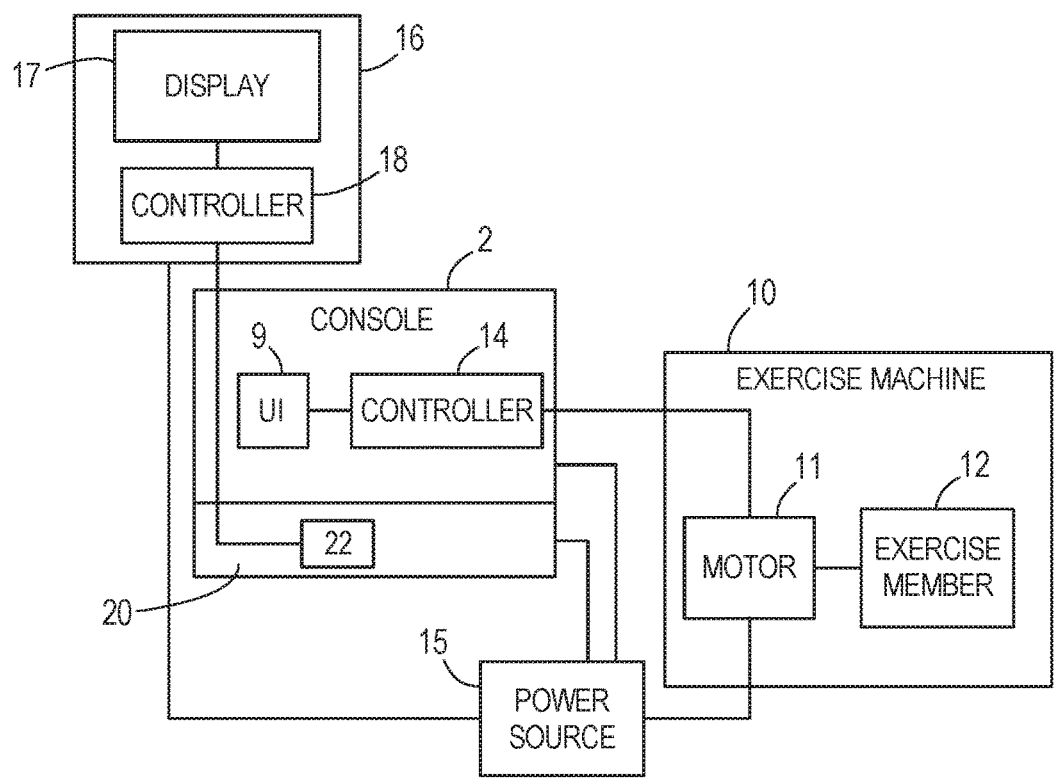
FIGS. 2A and 2B schematically depict exemplary embodiments of exercise machines with consoles having media racks.
Figure 2B:
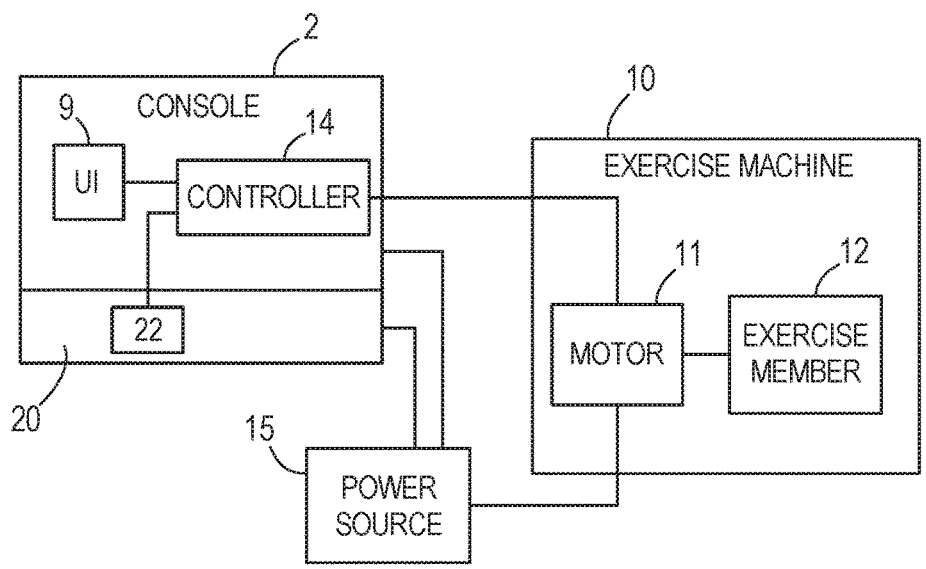

FIGS. 2A and 2B provide system diagrams of embodiments of exercise machines 10 having consoles 2 with the media racks 20 having a touch input element 22. In the depicted embodiments, the exercise machine 10 has an exercise member 12 facilitating exercise motion of a user. The exercise member 12 is attached to and propelled by a motor 11, which may be an electric motor, hydraulic motor, or any type of motor available in the art appropriate for propelling or otherwise controlling motion of an exercise member 12. A console 2 is associated with the exercise machine 10. The console 2 has user interface 9 and controller 14 that controls the motor 11, and thereby controls the function of the exercise machine 10. In various embodiments, the exercise machine 10 may have additional or alternative devices to control the exercise member 12, such as to adjust resistance or tension on the exercise member 12, and the controller 14 may control such alternative or additional auxiliary devices. The power source 15 powers the exercise machine 10, such as the motor 11, as well as the console 2, such as the user interface 9 and the controller 14 thereof. For example, the power source may be a battery or other energy storage device, a generator, or the electrical power grid, such as via a standard electrical outlet. The power source 15 may also power auxiliary devices on the media rack 20, including touch input element 22 and any other switch, button, lever, keypad, display, etc. thereon. In FIG. 2A, the exercise machine 10 has a media device 16 associated therewith, which is also powered by the power source 15.

Figure 3:
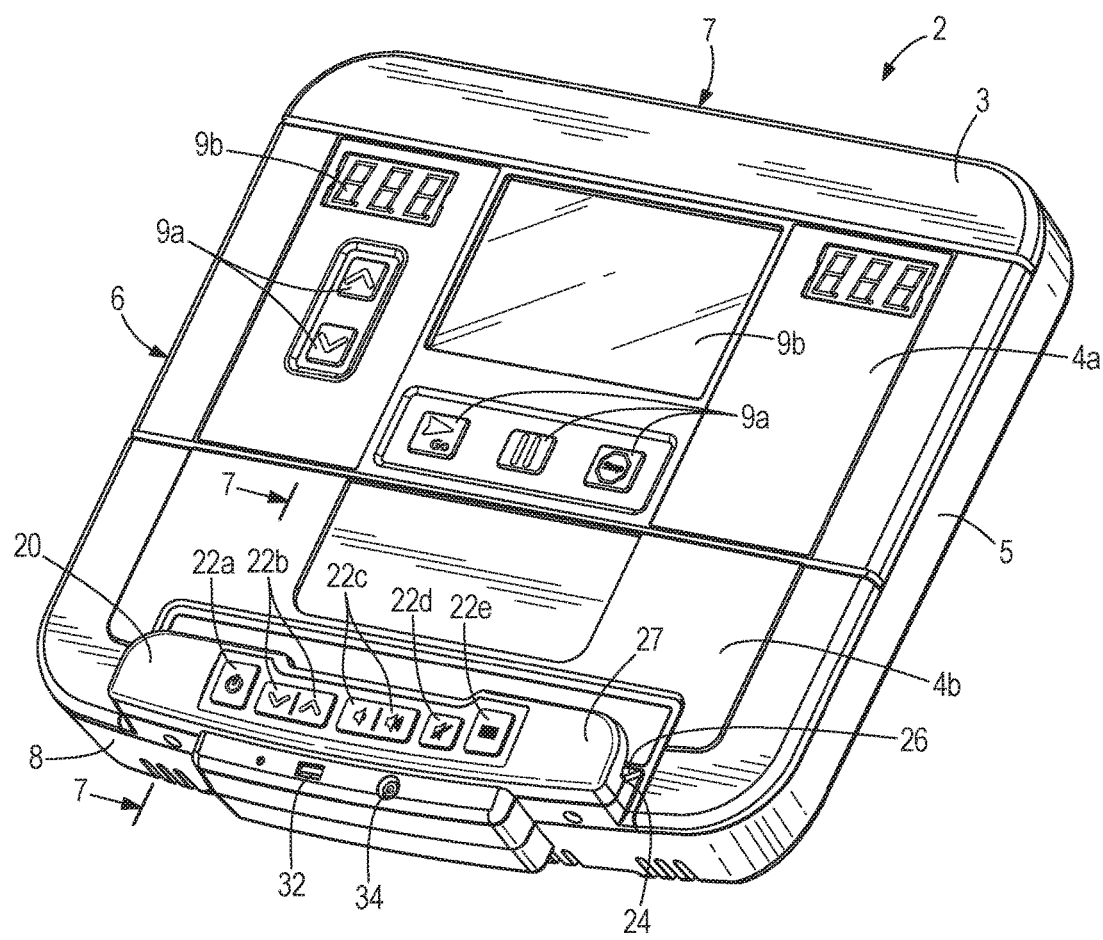
FIG. 3 depicts an exemplary embodiment of a console having a media rack.
Figure 5A:
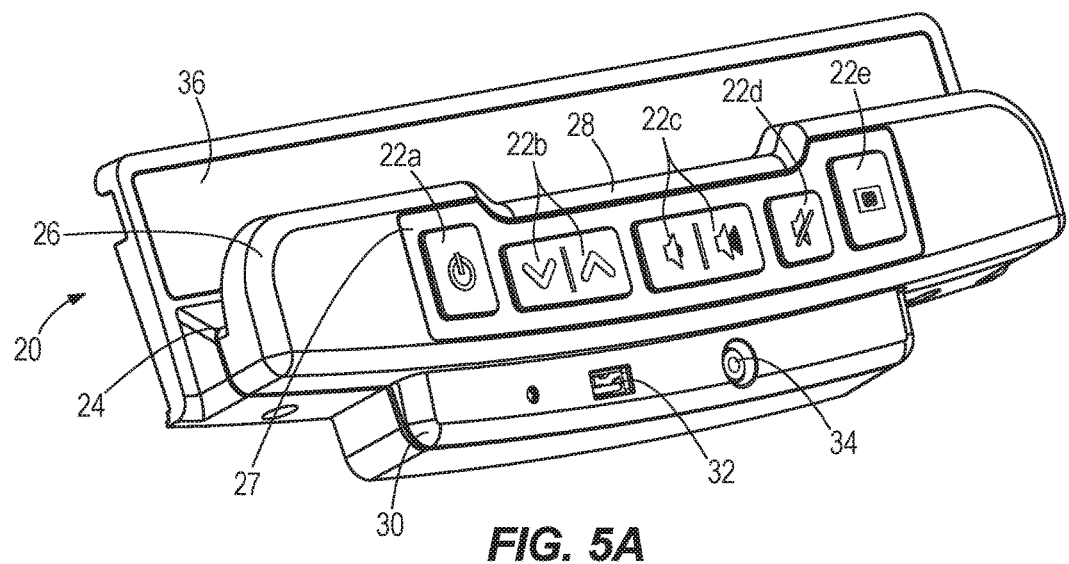
FIGS. 5A-5C depict an exemplary embodiment of a media rack.
Figure 5B:
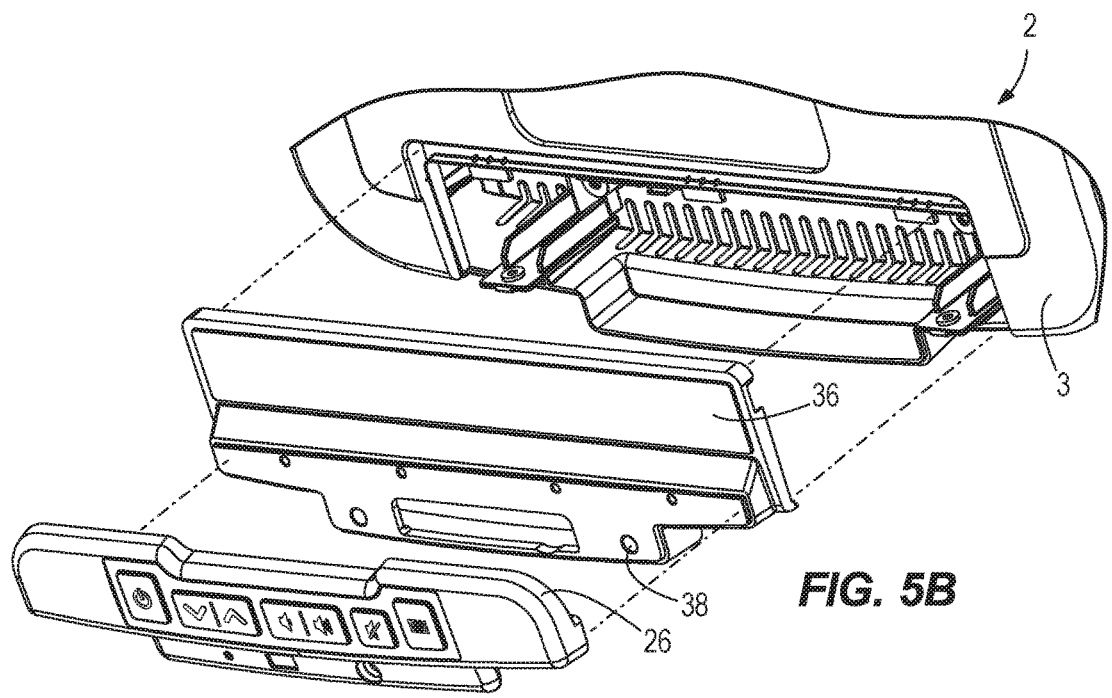

FIG. 2A depicts an arrangement where the media rack 20 provides a touch input element 22 that communicatively connects to the controller 18 of the media device 16. Accordingly, the touch input element 22 operates to control the media device 16 by providing control signals to the controller 18, which then controls the media device 16 accordingly, such as by controlling the channel, volume, data source, etc. By contrast, the embodiment of FIG. 2B does not include a media device, and the touch input element 22 is communicatively connected to the controller 14 and provides control input to control the operation of another auxiliary device or function. For example, as described above, the touch input element 22 may control an adaptive technology to adapt the exercise machine 10 for users with a particular disability. In other embodiments, the touch input element may provide additional control functionality to customize control functions provided by the controller 14, such as to provide specialized programming functions or user interface functions. For example, in one embodiment, the media rack 20 may provide a connection and interface with an auxiliary device that is a portable electronic device, such as the user's cell phone or tablet. In such an embodiment, the touch input element 22 may be configured to control or facilitate communication between the controller 14 of the exercise machine 10 and user's portable electronic device. For example, the controller 14 may receive personalized training profiles or personalized settings from the user's portable electronic device, and/or the controller 14 may communicate workout results or other workout-related information to the portable electronic device for storage therein, such as in an exercise or health tracking app. In still other embodiments, the media rack 20 may include one or more touch input elements 22 that may provide control input to a portable electronic device connected to the media rack 20 through connection port 32 (FIG. 3, 5a through 5b). For example, the touch input may control media functions on the electronic device, such as to control the selection of entertainment options, volume, etc. Such control may be desirable since using the small, more sensitive controls of many electronic media devices may be particularly difficult while the user is moving on the exercise machine 10, and the touch input elements 22 may provide controls that are adapted for and easier to use while exercising.

FIG. 3 provides one embodiment of a console 2 with a media rack 20 having touch input elements 22 thereon. The console 2 provides user interface elements 9, including user interface buttons 9a for controlling the operation of the exercise device and a user interface display 9b for displaying information to the user, such as user interface instructions, information regarding the user's workout, or the like. The user interface elements 9a, 9b are provided on the console housing 3 of the console 2, and specifically on the front face 4. In the depicted embodiment, an upper portion 4a of the front face provides user interface elements 9 to control the functionality of the exercise machine 10. A lower portion 4b of the front face of the console housing 3 provides the media rack 20 having touch input elements 22, which in this embodiment control the media device 16. Specifically, touch input element 22a is a power button to control the on/off function of the media device 16; touch input element of channel control buttons 22b provides up and down toggle switches to control a channel tuning of the media device 16; touch input element of volume control buttons 22c provides up and down toggle switches to control the volume of sound output from the media device 16; touch input element 22d is a mute button to turn off the sound output from the media device 16; and touch input element 22e is a closed caption control button to turn on and off closed captioning functions. In other embodiments, other controls may be provided to control other functionalities of the media device 16, such as screen brightness or contrast, or information source (e.g., cable, satellite, locally stored content, content stored on an accessory electronic device connected thereto, etc). In the depicted embodiment, the touch input elements 22a-22e are membrane switches. However, in other embodiments, the touch input elements 22 may be any type of touch interface, such as a resistive touch screen, a capacitive touch screen, a toggle switch, a mechanical switch, a plastic keyboard, etc. The depicted embodiment also includes a connection port 32 for connection with an external electronic device as is described above. In the depicted embodiment, the connection port 32 is a standard universal serial bus (USB) port. In other embodiments, the connection port 32 may be any other standard connection port available for connection with an electronic device or another auxiliary device. The media rack 20 also provides an audio jack, which may be any of a family of connectors used for transferring analog or digital audio signals. For example, the audio jack 34 may be a stereo plug, mini-stereo plug, mini jack, headphone jack, microphone jack, or the like, and may be provided in any of the standard available sizes. In the depicted embodiment, the audio jack 34 is a 3.5 mm headphone jack for accepting the pin-shaped plug from a standard pair of headphones.

Figure 4:
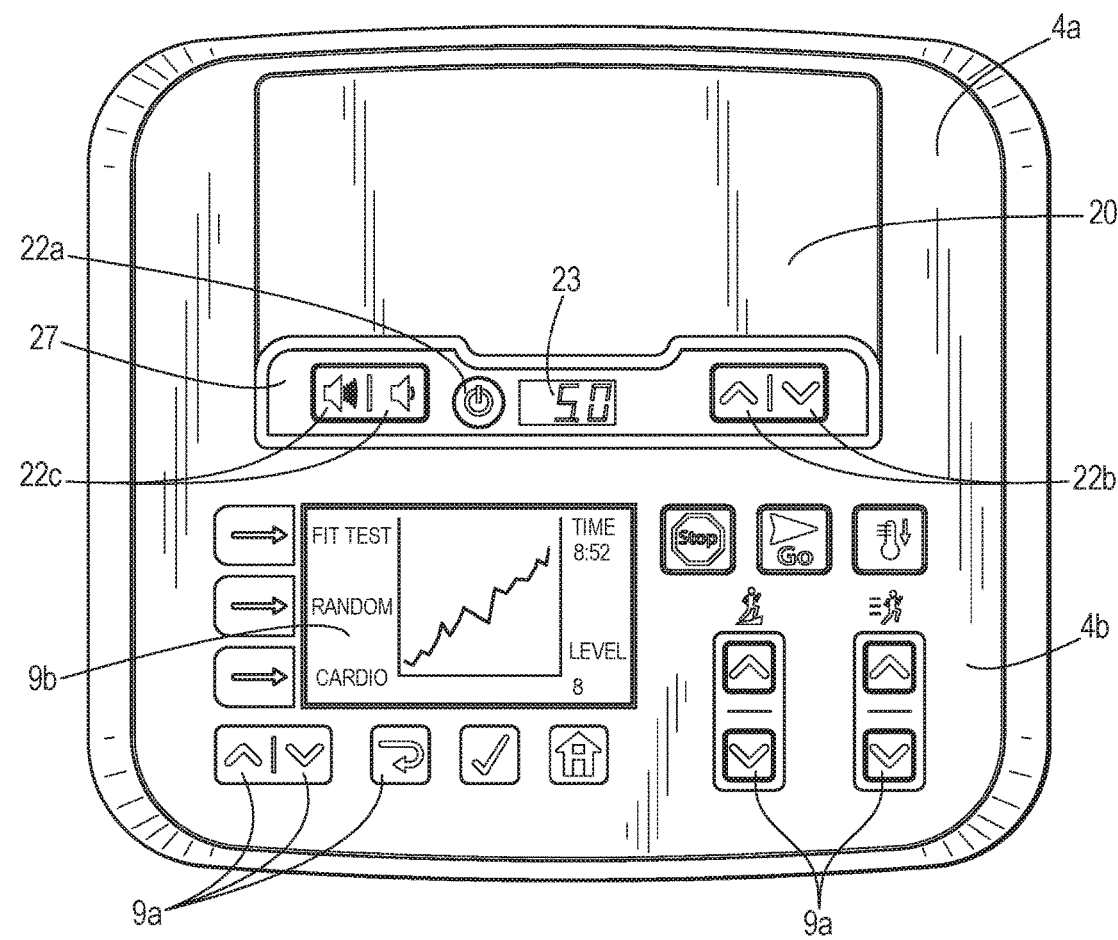
FIG. 4 depicts another exemplary embodiment of a console having a media rack.

FIG. 4 depicts another embodiment of a console 2 having a media rack 20 provided on an upper portion 4a of the front face of the console housing 3. In the depicted embodiment, the user interface buttons 9a and user interface display 9b for controlling and displaying the function of the exercise machine 10 is provided on the lower portion 4b of the front face. In other embodiments, the media rack 20 and user interface elements 9, including user interface buttons 9a and display 9b, may be provided in any arrangement on the console 2. For example, the media rack 20 may be provided in the center of the console, with the user interface elements 9 arranged around. In still other embodiments, the media rack 20 may connect to the top side 7, or bottom side 8 of the console housing 3, or may connect to the right side 5 or left side 6 of the console housing 3.

The media rack 20 depicted in FIG. 4 includes touch input elements 22 for controlling an auxiliary media device 16, including a power buttons 22a, channel control buttons 22b, volume control buttons 22c. The media rack 20 also includes a digital display 23, which may for example display the channel number being played on the media device 16. In other embodiments, the digital display 23 may display any information relating to the control or other input function provided on the media rack 20. The digital display 23 depicted is a segment display; however, any type of display device may be utilized, such as a liquid crystal display (LCD), a light-emitting diode (LED) display, a plasma display panel, an electronic paper display, or the like.

Figure 5C:
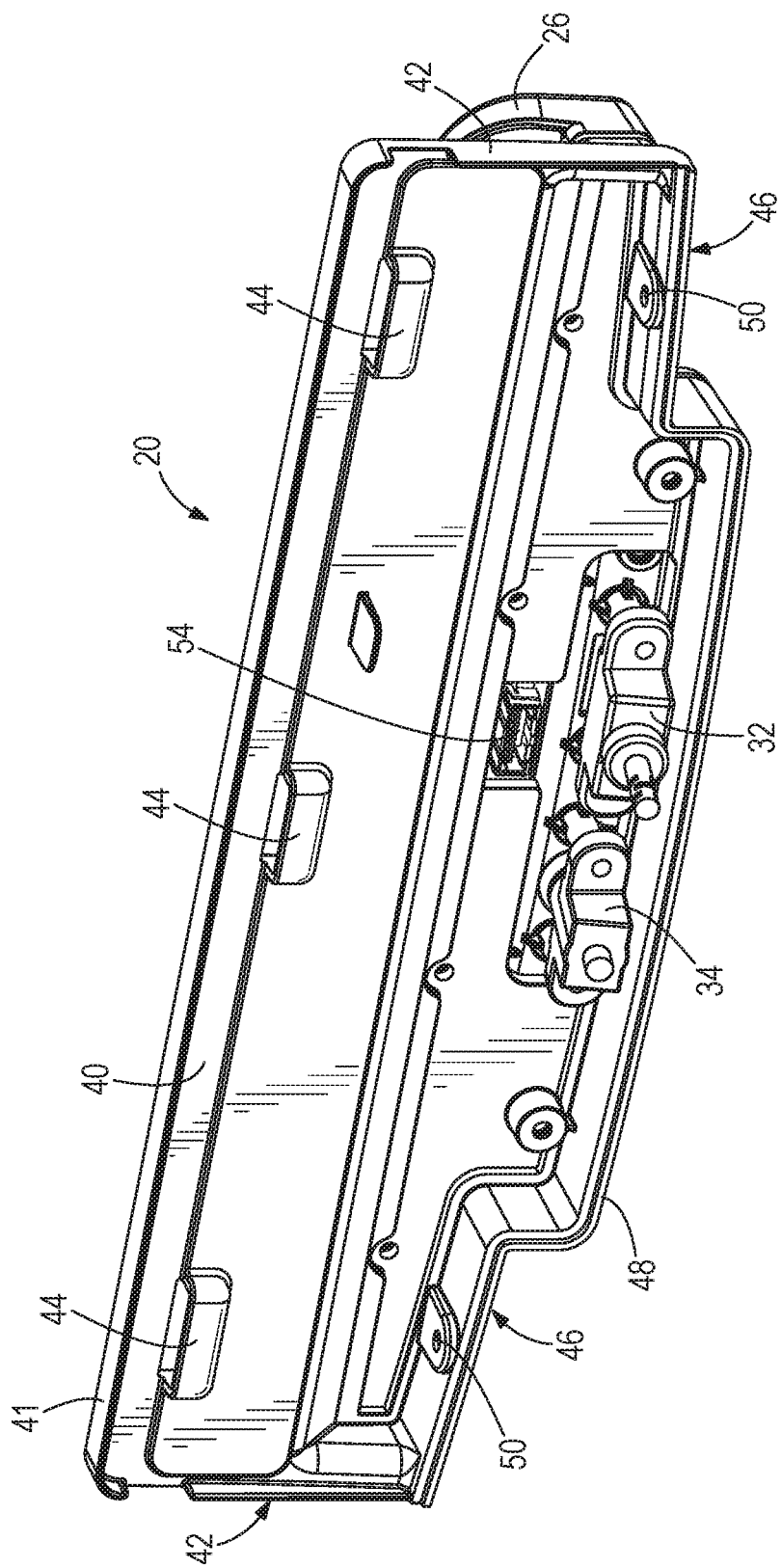
Figure 6:
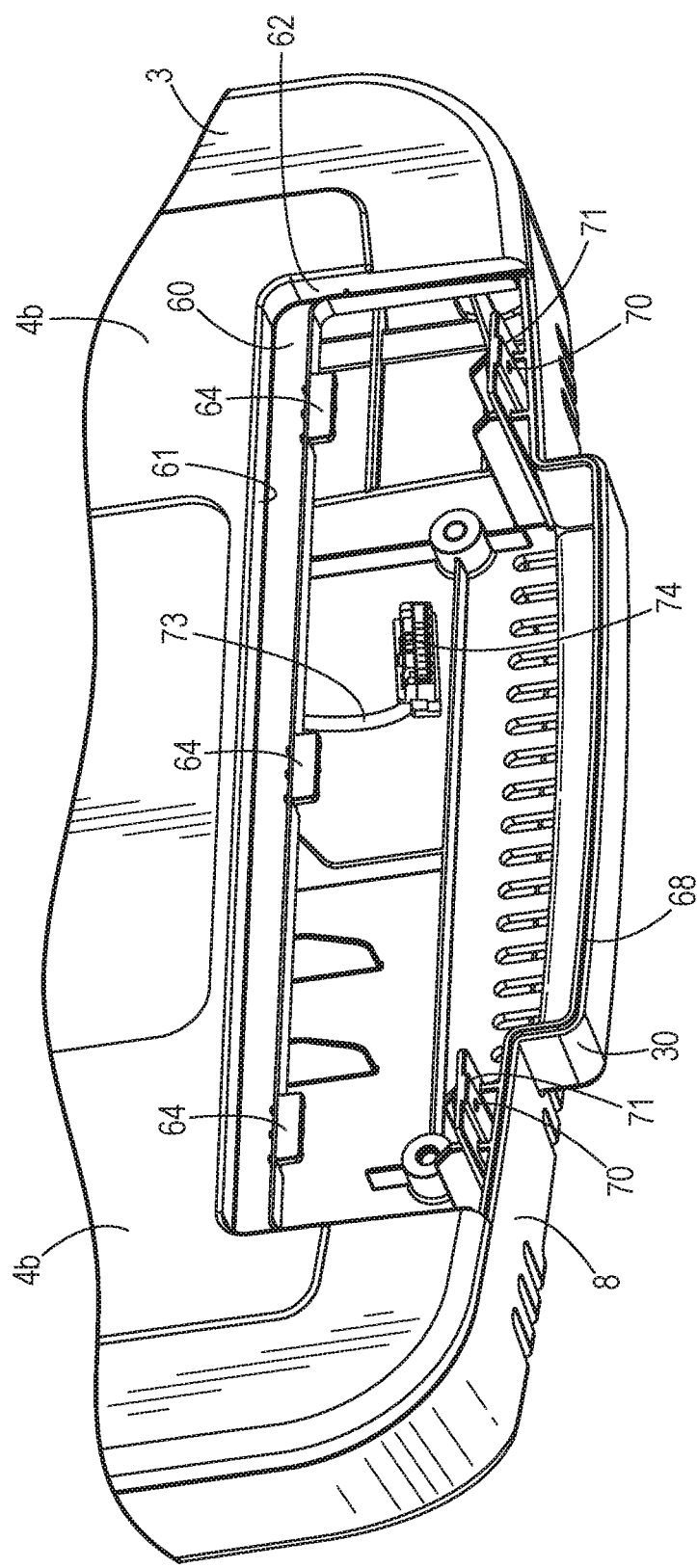
FIG. 6 depicts an exemplary embodiment of a console configured to receive the media rack of FIGS. 5A-5C.
Figure 7:
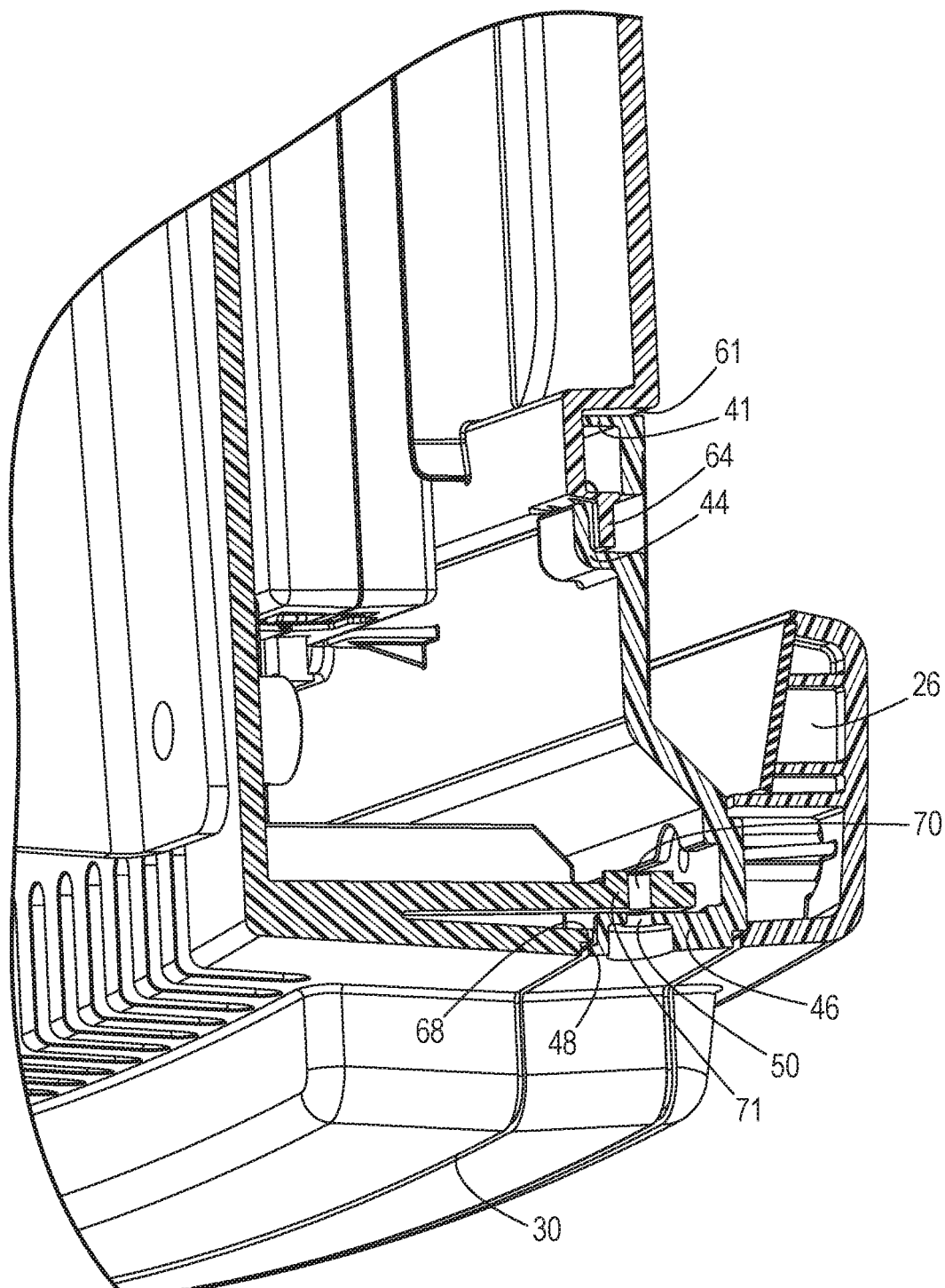
FIG. 7 depicts a cross-sectional view of the media rack of FIGS. 5A-5C assembled to the console of FIG. 6.

FIGS. 5A-5C depict one embodiment of a media rack 20 configured to attach to a console housing 3 on a console 2. FIG. 6 shows an exemplary embodiment of a console 2 configured to attach with the media rack 20 of FIGS. 5A-5C. FIG. 7 depicts the media rack 20 of FIGS. 5A-5C attached to the console 2 of FIG. 6. The depicted embodiment has a shelf 24 configured to support a media item, with a retaining ledge 26 at the end of the shelf 24 to maintain the media item on the shelf 24. A front bezel 27 is provided on the front side of the retaining ledge 26 having the touch input elements 22a-22e described above. The removable media rack 20 also has a lower panel 30 beneath the shelf 24, which in this embodiment provides the connection port 32 and audio jack 34.

The shelf 24 is sloped downward toward the retaining ledge 26, which facilitates maintaining the media item in a stationary position and leaned upward for ease of viewing by the user. In other embodiments, the shelf 24 may be flat or may be provided in any shape capable of supporting a media item. The retaining ledge 26 is configured to have a height appropriate for retaining various types of media items, such as magazines, books, or portable electronic devices. The retaining ledge 26 may include a groove 28 in the lateral center portion of the retaining ledge 26 that provides an area where the retaining ledge 26 is lower. This groove 28 area may be, for example, to provide easier access to a smaller media item, such as a cell phone or similar-sized portable electronic device. The sides of the retaining ledge 26 are taller to provide better retention of larger media devices and other media items, such as books or magazines with pages that need to be held in place.

The removable media rack has a back panel 36 to which the shelf 24 attaches. As demonstrated in FIG. 5B, the retaining ledge 26 and the back panel 36 may be separable pieces or the media rack 20. Reciprocal connectors 38 may be provided on the each of the retaining ledge 26 and the back panel 36 to connect the pieces together. Thus, removing and replacing the media rack 20 may include removal and replacement of just retaining ledge 26, or it may include removal and replacement of both the retaining ledge 26 and the back panel 36.

FIG. 5C depicts the back side 40 of the back panel 36, which provides connection with the console housing 3. As described above, in various embodiments, the media rack 20 may be configured such that it is removably connectable to the console housing 3 and can be connected and removed from the console housing 3 multiple times. In other embodiments, the media rack 20 may be configured to provide a more permanent connection with the console housing 3 such that, once the media rack 20 is connected to the console housing 3, it is difficult or impossible to remove from the console housing 3 without breaking or damaging one or more aspects of the media rack 20. In a related embodiment, the media rack 20 may be configured such that the back panel 36 connects to the console housing 3 in a permanent way, and the retaining ledge 26 having the touch input element(s) 22 removably connects thereto and is configured to be the portion that is changed out in order to adapt the console 2 to various auxiliary controls.

The console housing 3 has an indentation 60 shaped to receive the media rack 29 and provides means of connecting the media rack 20 thereto. In the depicted embodiment, the media rack 20 is designed to be removably connected to the console housing 3 by connectors provided on the back side 40 of the media rack 20 that mate with connectors on the console housing 3. Any means of providing such connection may be utilized, such as clasps, hooks, clips, friction fits, screws, pins, or the like. Multiple such connection means may also be used, as is illustrated in the depicted embodiments. The back side 40 has pockets 44 formed therein and sized to mate with, or receive, tabs 64 on the console housing 3. When connecting the media rack 20 to the console housing 3, the media rack 20 is tilted backward toward the console housing 3 and pushed upward so that the tabs 64 are inserted into the pockets 44. At that point, the top edge 41 of the media rack 20 abuts the top edge 61 of the indentation 60 in the console housing 3, and the side edges 42 of the media rack 20 abut the side edges 62 of the indentation 60.

On the bottom side, the media rack 20 has an outer bottom lip 48 on its bottom side 46 that fits with an inner bottom lip 68 on the bottom side 8 of the console housing 3. Accordingly, the media rack 20 and the indentation 60 in the console housing 3 have complementary mating edges surrounding the media rack 20. Once these complementary edges are properly secured together, screws or other connectors may be inserted to secure the media rack 20 to the console housing 3. In the depicted embodiment, screws are inserted through the screw holes 50 on the bottom side 46 of the media rack 20 and extend up and engage screw holes 70 in the securing tongues 71 on either side of the indentation 60. As shown best in the cross-sectional view of FIG. 7, the securing tongues 71 extend forward from the inner bottom lip 68 on the console housing 3 so as to extend above the screw holes 50 on the bottom side 46 of the media rack 20. Accordingly, to remove the media rack 20 from the console housing 3, the screws are first removed, and then the media rack 20 is slid downwards and out from the console housing 3. A different media rack 20 may then be placed on the console 2, such as with different auxiliary device controls.

Each of the console 2 and the media rack 20 may be provided with complimentary electrical terminals 54, 74 to provide a removable electrical data connection and/or electrical power connection between the auxiliary device(s) or the console 2 and in the media rack 20. In the exemplary embodiment, the electrical terminal 74 may be accessible from each of the console housing 3 and the back side 40 of the media rack 20 such that the electrical terminal 54 on the media rack 20 may be connected to the electrical terminal 74 associated with the console 2. Specifically, a wire 73 may extend through the console housing 3 and provide an electrical terminal 74 for connection with the electrical terminal 54 on the media rack 20. The electrical terminals 54, 74 may be any type of terminal providing a point of electrical connection between one or more circuits in the media rack 20 and circuits in the console 2. For example, connection of the electrical terminals 54, 74 may connect the printed circuit boards of the membrane switches of the depicted embodiments to circuitry within the console 2 and/or the media device 16. The electrical terminals 54, 74 may be fitted with any type of connector or fastener. In the depicted embodiment the electrical terminal 54 on the media rack 20 is a 1.50 mm Pitch CLIK-Mate™ Wire-to-Board PCB Receptacle, part number 502584-0860, by Molex Incorporated, and the terminal 57 on the console-side is a CLIK-Mate™ Wire-to-Board Housing, part number 502578-0800, also by Molex. Other standard connectors may be used, and may be chose based on the type of circuitry associated with the touch input device (i.e., whether power is needed, and the amount of data being transmitted). Examples of electrical terminal 54, 74 connections include USB, high-definition multimedia interface (HDMI), or any other standard connection providing both power and data transfer. In other embodiments, two electrical connections may be provided between the media rack 20 and the console 2, one for data, and the other for power. In still other embodiments, the electrical terminals 54, 74 may connect by other means, such as by clips, hooks, cups, screw terminals, tab terminals, wire nuts, tongue print terminals, splices, or the like. Alternatively, the data connection between the media rack 20 and the console 2 may be a wireless connection, such as via any wireless networking standard, Bluetooth standard, or the like. Likewise, in embodiments where the media rack 20 is removably connected to the console 2, the electrical terminals 54, 74 are preferably provided with removable connectors which can be disconnected and reconnected numerous times while maintaining functionality.

In the present description, certain terms have been used for brevity, clearness and understanding. No unnecessary imitations are to be implied therefrom beyond the requirement of the prior art because such terms are used for descriptive purposes only and are intended to be broadly construed. The different devices and apparatuses described herein may be used alone or in combination with other devices and apparatuses. Various equivalents, alternatives and modifications are possible within the scope of the appended claims.

What is claimed is:

1. A console for an exercise machine, the console comprising:
   a console housing providing a user interface for controlling the exercise machine, the console housing a first connector;
   a media rack removably attached to the console housing, the media rack having a second connector connectable to the first connector to removably attach the media rack to the console housing;

the media rack having a shelf extending generally horizontally and sized to accommodate and support any of various media items and a retaining ledge at the end of the shelf to maintain the any of various media items on the shelf; and at least one touch input element on the media rack operable by a user to control a function of an auxiliary device to the exercise machine.

2. The console of claim 1 further comprising at least one electrical terminal on the media rack coupled to an electrical terminal on the console to power the at least one touch input element.

3. The console of claim 1 further comprising at least one electrical terminal on the media rack coupled to an electrical terminal on the console to transfer data from the touch input element to a controller for the exercise machine.

4. The console of claim 1 further comprising at least one electrical terminal on the media rack coupled to an electrical terminal on the console to transfer data from the touch input element to a controller for the auxiliary device.

5. The console of claim 1 wherein the media rack can be attached to and removed from the console housing while the console housing is installed on the exercise machine.

6. The console of claim 5 wherein the media rack is removably attached to a front face of the console housing.

7. The console of claim 6 wherein the media rack is removably attached to a lower portion of the front face, and wherein the first connector and the second connector are connectable together by at least one screw.

8. The console of claim 5 wherein one of the first connector and the second connector includes at least one tab, and the other of the first connector and the second connector includes at least one pocket that receives the tab.

9. The console of claim 1 wherein the media rack is removably attached to one of a top side, a bottom side, a right side, and a left side of the console housing.

10. The console of claim 1 wherein the auxiliary device to the exercise machine is a television mounted on the exercise machine, and the at least on touch input is operable to control power, volume, or channel of the television.

11. The console of claim 10 wherein the at least one touch input element is a membrane switch on a front bezel on the retaining ledge.

12. The console of claim 1 wherein the auxiliary device is an assistive technology for persons with disabilities, and the at least one touch input element is operable to control the assistive technology for persons with disabilities.

13. The console of claim 1 wherein the at least one touch input element is on a front bezel on the retaining ledge of the media rack.

14. The console of claim 13 wherein the at least one touch input element is a membrane switch.

15. The console of claim 1 further including at least one of a USB port and an audio jack on the media rack.

16. An exercise machine comprising:

a console providing a user interface for controlling the exercise machine, the console having a console housing the console housing having an indentation and a first connector;

a media rack attached to the console housing and having a shelf sized to support a media item, the media rack having a second connector connectable to the first connector to attach the media rack to the console housing;

wherein the indentation in the console housing is shaped to receive the media rack and the media rack is positioned in the indentation when attached to the console housing; and at least one touch input element on the media rack operable by a user to control a function of an auxiliary device to the exercise machine.

17. The exercise machine of claim 16, wherein the indentation is on a front face of the console housing and the media rack is removably attached within the indentation, and wherein the media rack further comprises an electrical terminal that removably connects to an electrical terminal associated with the console in order to power the at least one touch input element.

18. The exercise machine of claim 17, wherein the touch input element is operable to control a media device on the exercise machine, and the connection between the electrical terminal on the media rack and the electrical terminal associated with the console transfers a control command from the touch input element to a controller for the media device.

19. The exercise machine of claim 18, wherein the touch input element is one of a membrane switch or a touch screen and the media device is a television.

20. The exercise machine of claim 17, wherein the touch input element is a membrane switch and is on a front bezel of the media rack.

* * * * *